US010406601B2

(12) United States Patent
Martin et al.

(10) Patent No.: US 10,406,601 B2
(45) Date of Patent: Sep. 10, 2019

(54) 3D PRINTED HEAT EXCHANGER

(71) Applicant: Caterpillar Inc., Peoria, IL (US)

(72) Inventors: Kevin L. Martin, Washburn, IL (US);
Vivek Sundararaj, Peoria, IL (US);
Paul Arthur Zwart, Dunlap, IL (US);
Ryan Antony Lozier, Peoria, IL (US);
Steven R. Storm, Edelstein, IL (US)

(73) Assignee: Caterpillar Inc., Deerfield, IL (US)

( * ) Notice: Subject to any disclaimer, the term of this patent is extended or adjusted under 35 U.S.C. 154(b) by 91 days.

(21) Appl. No.: 15/607,911

(22) Filed: May 30, 2017

(65) Prior Publication Data

US 2018/0345353 A1 Dec. 6, 2018

(51) Int. Cl.
| | |
|---|---|
| *B21D 53/02* | (2006.01) |
| *B05C 19/04* | (2006.01) |
| *B22F 7/02* | (2006.01) |
| *F28F 3/02* | (2006.01) |
| *F28F 3/12* | (2006.01) |
| *F28D 9/00* | (2006.01) |
| *E02F 9/22* | (2006.01) |
| *F01M 5/00* | (2006.01) |
| *B22F 5/10* | (2006.01) |
| *B33Y 80/00* | (2015.01) |

(Continued)

(52) U.S. Cl.
CPC ............ *B22F 7/02* (2013.01); *B22F 5/106* (2013.01); *B33Y 80/00* (2014.12); *E02F 9/22* (2013.01); *F01M 5/002* (2013.01); *F28D 9/0012* (2013.01); *F28F 3/025* (2013.01); *F28F 3/12* (2013.01); *B05C 19/04* (2013.01); *B21D 53/02* (2013.01); *B21D 53/022* (2013.01); *B22F 3/008* (2013.01); *B22F 3/1055* (2013.01); *B33Y 10/00* (2014.12); *F28D 7/024* (2013.01); *F28D 7/026* (2013.01); *F28D 7/028* (2013.01); *F28D 7/04* (2013.01); *F28D 9/0018* (2013.01); *F28D 2021/0089* (2013.01); *F28F 1/10* (2013.01); *F28F 1/126* (2013.01); *F28F 1/14* (2013.01); *F28F 1/22* (2013.01); *F28F 1/32* (2013.01); *F28F 1/36* (2013.01); *F28F 1/42* (2013.01)

(58) Field of Classification Search
CPC ...... B21D 53/022; B21D 53/02; B05C 19/04; B22F 7/02; F28F 1/10; F28F 1/126; F28F 1/22; F28F 1/32; F28F 1/42; F28F 1/14; F28F 1/36; F28D 7/024; F28D 7/026; F28D 7/028; F28D 7/04
USPC ................ 165/148, 171, 179, 182, 183, 184
See application file for complete search history.

(56) References Cited

U.S. PATENT DOCUMENTS 4,096,616 A * 6/1978 Coffinberry ............ B21D 53/06
29/890.036
5,282,507 A * 2/1994 Tongu ..................... F25B 15/02
165/165

(Continued)

Primary Examiner — Joel M Attey
(74) Attorney, Agent, or Firm — Law Office of Kurt J. Fugman LLC

(57) ABSTRACT

A heat exchanger comprises a seamless body, and the seamless body may include a substantially cylindrical configuration defining a radial direction, a circumferential direction, a longitudinal axis, a first cylindrical wall and a plurality of fins. Each fin may extend at least partially in the radial direction and helically along the longitudinal axis. Also, each fin may be at least partially hollow defining an internal flow passage, and each fin of the plurality of fins may be at least partially spaced away from an adjacent fin, defining an external flow passage.

12 Claims, 10 Drawing Sheets

(51) Int. Cl.
  *F28D 7/02*    (2006.01)
  *F28D 7/04*    (2006.01)
  *F28F 1/12*    (2006.01)
  *F28F 1/32*    (2006.01)
  *F28F 1/10*    (2006.01)
  *F28F 1/22*    (2006.01)
  *F28F 1/42*    (2006.01)
  *F28F 1/36*    (2006.01)
  *F28F 1/14*    (2006.01)
  *F28D 21/00*   (2006.01)
  *B22F 3/00*    (2006.01)
  *B22F 3/105*   (2006.01)
  *B33Y 10/00*   (2015.01)

(56) References Cited

U.S. PATENT DOCUMENTS

| | | | |
|---|---|---|---|
| 2008/0000617 A1* | 1/2008 | Cortina-Cordero | F24F 7/065 165/59 |
| 2013/0192804 A1* | 8/2013 | Matsuda | F28D 7/10 165/154 |
| 2017/0184352 A1* | 6/2017 | Zaric | F28F 9/02 |
| 2017/0219295 A1* | 8/2017 | Kenworthy | F02K 3/115 |

* cited by examiner

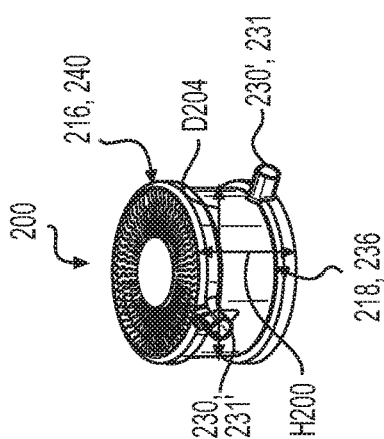
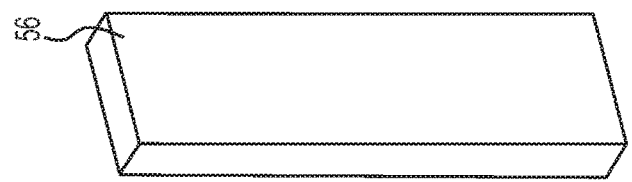
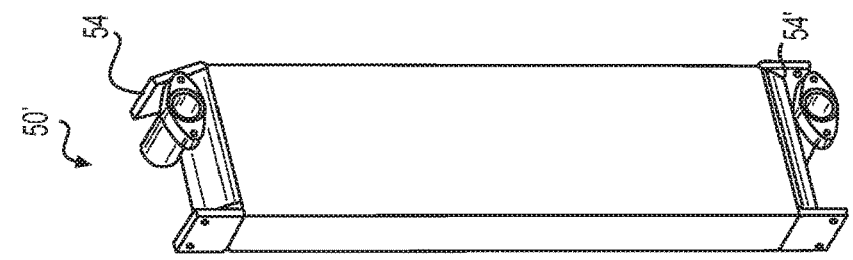
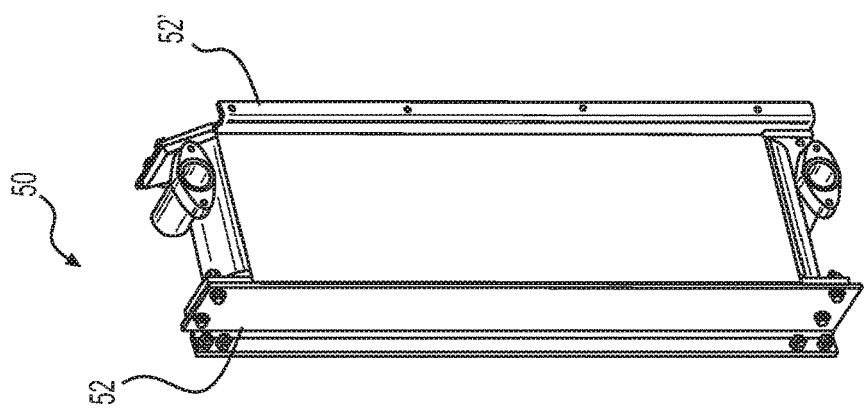
FIG. 11 PRIOR ART
FIG. 12 PRIOR ART
FIG. 13 PRIOR ART
FIG. 14

3D PRINTED HEAT EXCHANGER

TECHNICAL FIELD

The present disclosure relates to heat exchangers used to cool the hydraulic fluid used to power the mechanisms of earth moving, construction and mining equipment and the like. Specifically, the present disclosure relates to a heat exchanger that is manufactured using 3D printing technology, allowing more complex geometry to be used in the heat exchanger.

BACKGROUND

Earth moving, construction and mining equipment and the like often use hydraulic oil/fluid in various mechanisms to power the function of work implements, booms, hydraulic cylinders, etc. This hydraulic oil heats up over time, necessitating that the oil be cooled. As a result, heat exchangers are routinely used in this equipment to cool the hydraulic oil.

The features and geometry employed by such heat exchangers is limited by the manufacturing techniques available to make the heat exchangers. The technologies typically used include extrusion, forming or bending, welding and brazing. High efficiency heat exchangers usually have tiny or intricate features that are repeated a great number of times. These tiny or intricate features may be delicate and may be difficult to form. Consequently, these features are usually limited to extrusions of two dimensional shapes (e.g. straight fins or tubes). Furthermore, these features are joined typically using brazing or welding that creates a seam or joint in the heat exchanger. This may create an area of high stress due to abrupt geometry changes, as well as potential leak points due to poor quality of the seams or joints.

SUMMARY

A heat exchanger according to an embodiment of the present disclosure may comprise a seamless body comprising a first cylindrical wall, defining a longitudinal axis, a radial direction passing through the longitudinal axis being perpendicular thereto, a circumferential direction that is perpendicular to the longitudinal axis and tangential to the radial direction, and a plurality of fins. Each fin may extend at least partially in the radial direction and helically along the longitudinal axis. Also, each fin may be at least partially hollow defining an internal flow passage, and each fin may be at least partially spaced away from an adjacent fin, defining an external flow passage.

A heat exchanger assembly according to an embodiment of the present disclosure may comprise a heat exchanger including a body including an outer cylindrical wall and an inner cylindrical wall, wherein the outer cylindrical wall and the inner cylindrical wall define the same longitudinal axis, the same radial direction that passes through the longitudinal axis and that is perpendicular thereto, and the same circumferential direction that is tangential to the radial direction and perpendicular to the longitudinal direction, and the inner cylindrical wall is spaced radially away from the outer cylindrical wall, the body further defining a first end and a second end disposed along the longitudinal axis, and a plurality of fins extending radially from the outer cylindrical wall toward the inner cylindrical wall, each of the plurality of fins also extending in a curved or arcuate path longitudinally from the first end to the second end. Each fin is at least partially hollow defining an internal flow passage and each fin is at least partially spaced away from an adjacent fin, defining an external flow passage. The assembly may further include a fan disposed proximate either the first end or the second end of the body of the heat exchanger, and the outer cylindrical wall defines a first diameter and the fan defines a second diameter that is equal to or greater than then the first diameter.

A method for manufacturing a heat exchanger according to an embodiment of the present disclosure comprises providing a computer-readable three-dimensional model of the heat exchanger, the three-dimensional model being configured to be converted into a plurality of slices that each define a cross-sectional layer of the heat exchanger, and successively forming each layer of the heat exchanger by additive manufacturing.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 11 is a perspective view of a heat exchanger previously known in the art with steel reinforcing plates.

FIG. 12 is a perspective view of the heat exchanger of FIG. 11 with the steel reinforcing plates removed.

FIG. 13 is a perspective view of the heat exchanger of FIG. 12 with the manifolds removed.

FIG. 14 is a perspective view of a heat exchanger according to an embodiment of the present disclosure showing its dramatic size reduction compared to the heat exchangers of FIGS. 11 thru 13.

DETAILED DESCRIPTION

Figure 1:
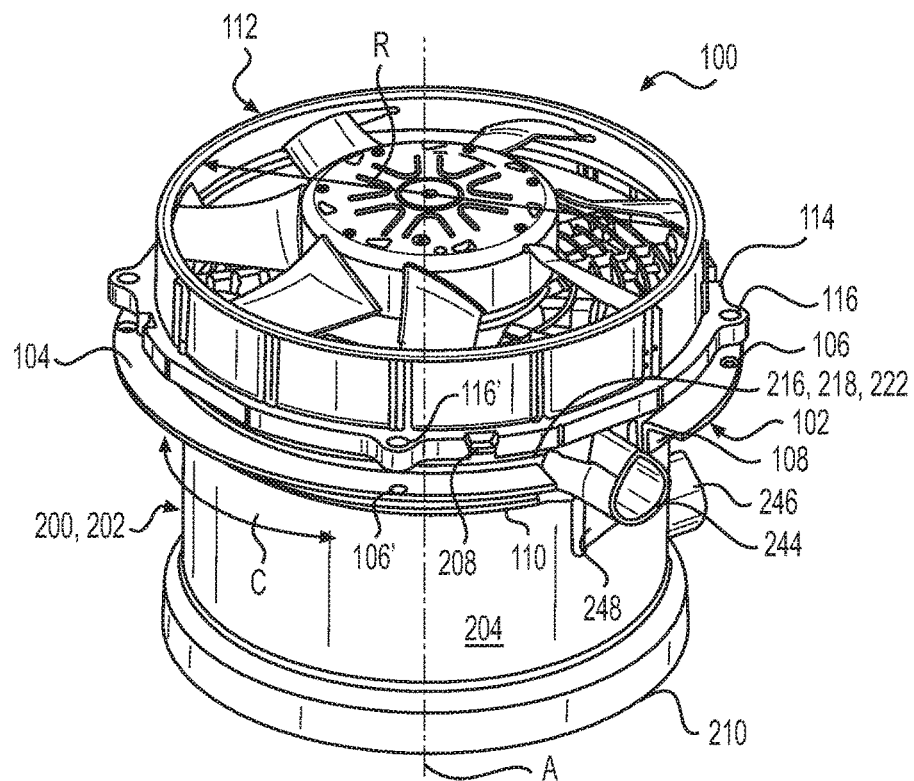
FIG. 1 is a perspective view of a heat exchanger assembly with a heat exchanger with helical fins manufactured using 3D printing or other additive manufacturing technology according to an embodiment of the present disclosure, an attachment bracket, and a fan.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a heat exchanger, which may be created using 3D printing technology or other additive manufacturing technologies will now be described. Such heat exchangers may be used in a heat exchanger assembly including a fan. A method and system for manufacturing such a heat exchanger will also be described. While particular embodiments disclose a heat exchanger used to cool hydraulic oil of a machine used in the construction, mining or earthmoving industries or the like, using air as the cooling fluid or medium, it is contemplated that the heat exchanger or heat exchanger assembly according to any embodiment described herein may be used in other applications and industries and may involve the use of other fluids or mediums.

Figure 2:
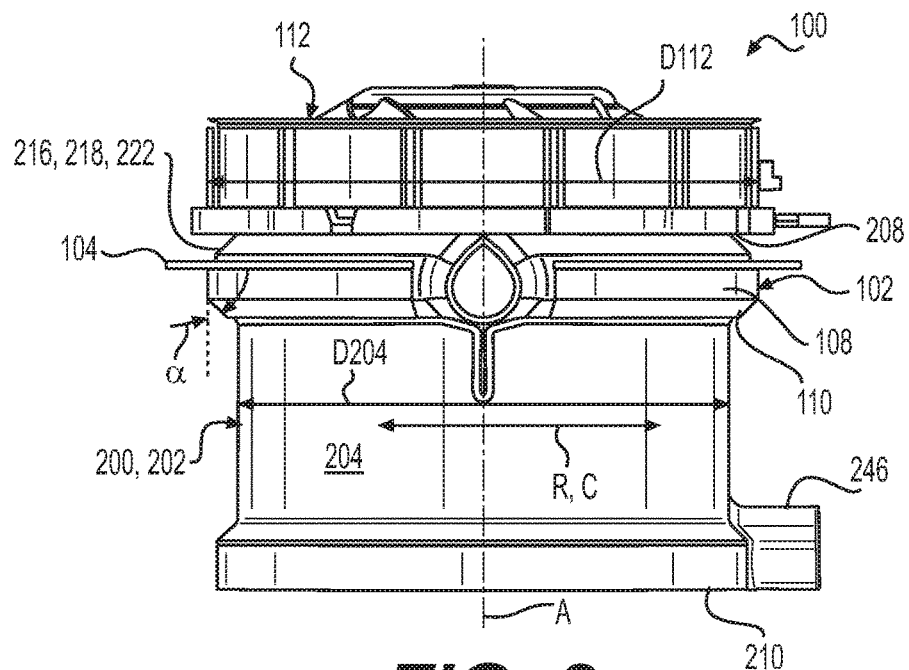
FIG. 2 is a front view of the heat exchanger assembly of FIG. 1.
Figure 3:
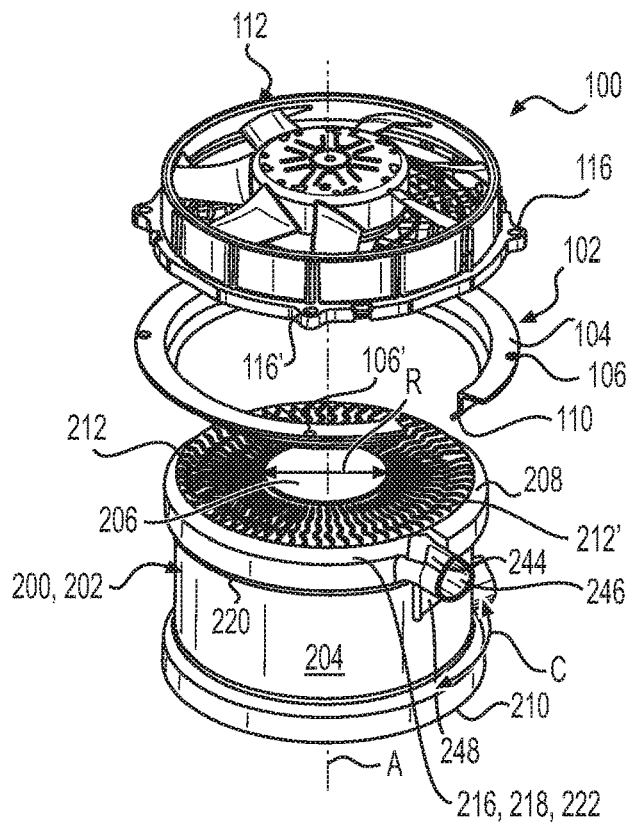
FIG. 3 is an exploded assembly view of the heat exchanger assembly of FIG. 1.

Looking at FIGS. 1 thru 3, a heat exchanger assembly 100 according to an embodiment of the present disclosure comprises a heat exchanger 200 including a seamless body 202 having a substantially cylindrical configuration defining a radial direction R, a circumferential direction C and a longitudinal axis A (or cylindrical axis). The seamless body 202 also includes an outer cylindrical wall 204 and an inner cylindrical wall 206 spaced radially away from the outer cylindrical wall 204, the seamless body 202 further defining a first end 208 and a second end 210 disposed along the longitudinal axis A. The seamless body 202 also includes a plurality of fins 212 extending radially from the outer cylindrical wall 204 toward the inner cylindrical wall 206, each of the plurality of fins 212 also extending in a curved or arcuate path 214 (see FIGS. 7 and 8) longitudinally from the first end 208 to the second end 210. In some embodiments, this curved or arcuate path 214 may be substantially helical or spiral in nature about the longitudinal axis A.

Put another way, the heat exchanger includes a cylindrical wall that defines a longitudinal axis A, a radial direction R that is perpendicular to the cylindrical axis and that passes through the cylindrical axis, and a circumferential direction C that is tangential to the radial direction R and perpendicular to the longitudinal axis A.

With continued reference to FIGS. 1 thru 3, the heat exchanger assembly 100 may further comprise a C-shaped attachment bracket 102 including a horizontal annular member 104 defining a first plurality of apertures 106, a vertical annular member 108 extending downward from the horizontal annular member 104, and an angled flange 110 extending from the vertical annular member 108 at an angle α relative to the longitudinal axis A, configured to engage the first hollow ring member 216 of the first fluid manifold portion 218. The C-shaped attachment bracket 102 may be snapped or placed about the circumference of the outer cylindrical wall 204 of the heat exchanger 200 or be forced downward over the top wall 222 of the first hollow ring member 216 of the first fluid manifold portion 218. Then, the attachment bracket 102 may be raised until the angled flange 110 contacts the bottom wall 220 of the first hollow ring member 216, preventing the C-shaped attachment bracket 102 from sliding off the heat exchanger 200 along the longitudinal axis A of the heat exchanger 200.

A fan 112 may be disposed proximate either the first end 208 or the second end 210 of the seamless body 202 of the heat exchanger 200. The fan 112 may be electrically powered to propel air or another suitable cooling fluid through the heat exchanger 200. Of course, the configuration of the fan 112 and the way it is powered may be varied as needed or desired in other embodiments. The outer cylindrical wall 204 defines a first diameter D204 and the fan 112 defines a second diameter D112 that is equal to or greater than then the first diameter D204. An outer flange 114 is disposed about the lower part of the circumference of the fan 112 next to the first end 208 or second end 210 of the heat exchanger 200. This outer flange 114 defines a second plurality of apertures 116 that aligns with the first plurality of apertures 106 of the C-shaped attachment bracket 102. Consequently, the fan 112 may be fastened onto the C-shaped attachment bracket 102, fixing the position of the fan 112 relative to the first end 208 or second end 210 of the heat exchanger 200. As shown in FIGS. 1 thru 3, the fan is located on top of the heat exchanger and is in blower mode. The fan could also be on the bottom of the heat exchanger in a sucker mode, or fan could be placed on the top and bottom of the heat exchanger simultaneously, with one fan in blower mode and the other in sucker mode.

Figure 4:
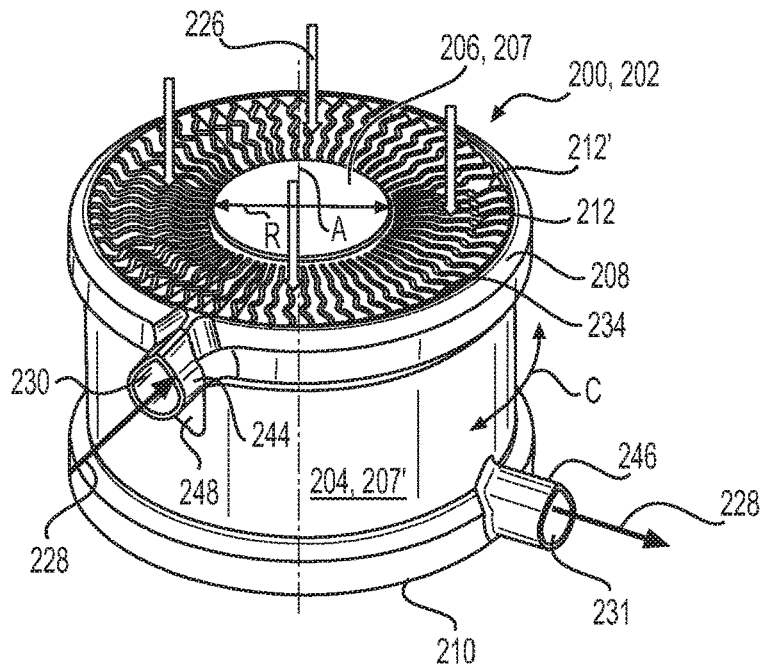
FIG. 4 is a perspective view of the heat exchanger of FIG. 1.
Figure 5:
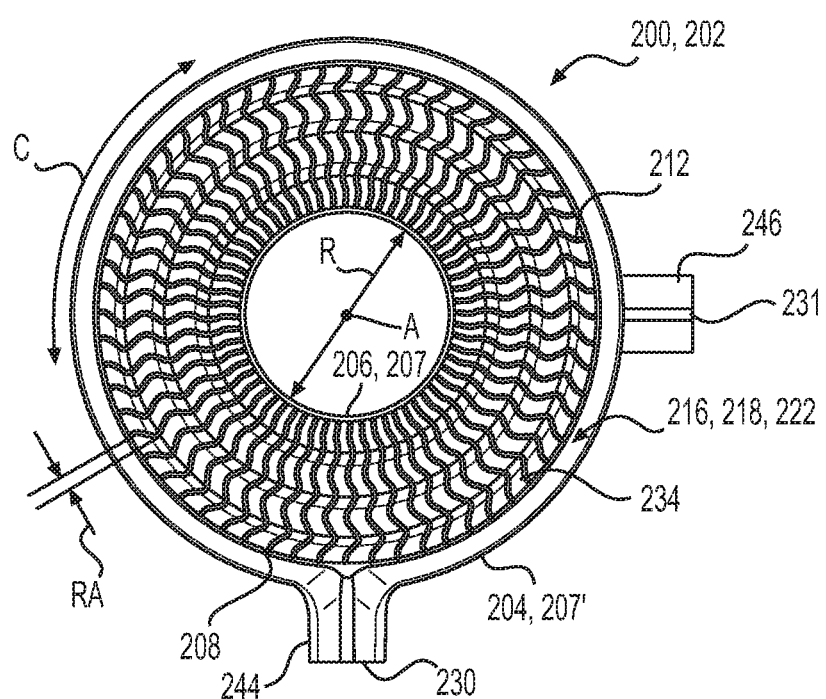
FIG. 5 is a top view of the heat exchanger of FIG. 1.

Turning now to FIGS. 4 and 5, the cooling fluid 226 (e.g. air) is shown to be flowing downward through the heat exchanger 200, past the fins 212, as powered by the fan 112. At the same time, the oil or other fluid whose temperature is to be cooled (cooled fluid 228), is entering through an inlet 230, shown to be near the top (or first end 208) of the heat exchanger 200 and egressing through an outlet 231, shown to be near the bottom (or second end 210) of the heat exchanger 200. The flow of the oil is often powered by a pump (not shown) or the like. The flow of the cooling fluid 226 versus the flow of the cooled fluid 228 shown in FIG. 4 is parallel flow but counterflow is also a possibility. In such a case, the direction of the flow of the air may remain unchanged and the oil would flow in the opposite direction than what is shown in FIG. 4. The rate and/or type of flow for either the cooling or cooled fluids may be turbulent, for reasons that will be discussed later herein.

Figure 6:
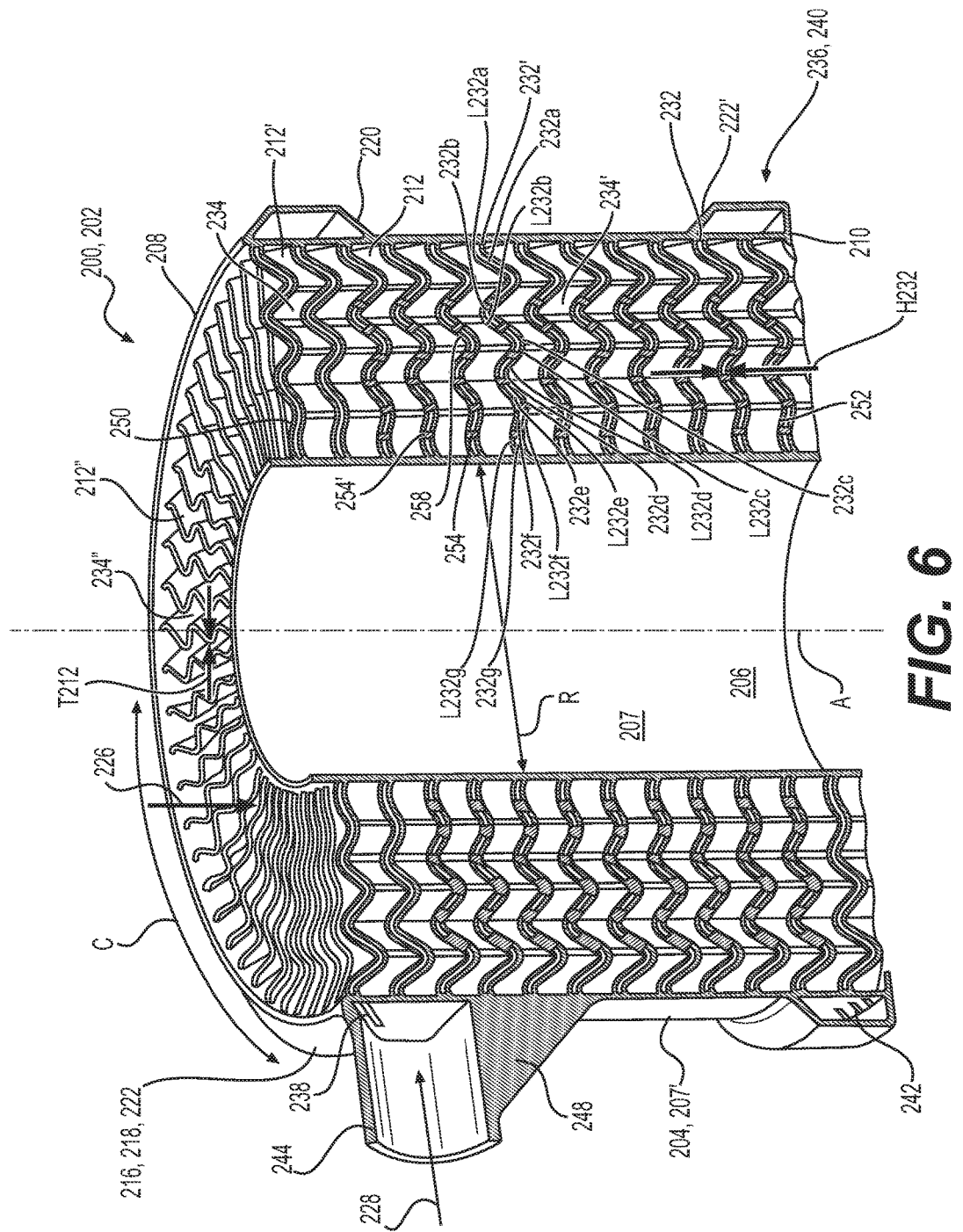
FIG. 6 is a sectional view of the heat exchanger of FIGS. 4 and 5 taken along a midplane of the heat exchanger.
Figure 7:
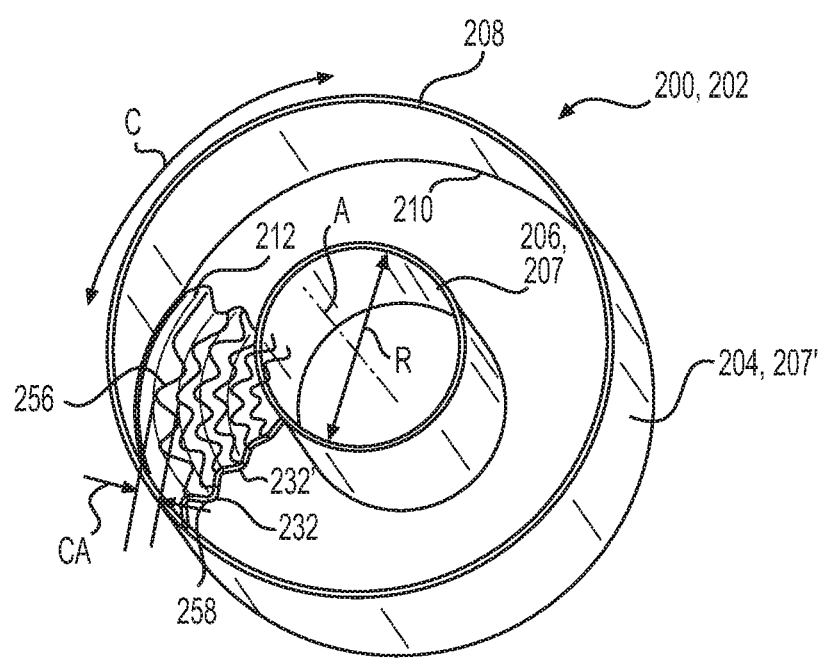
FIG. 7 is a partial fragmentary view showing only a single fin of the heat exchanger of FIGS. 4 and 5.
Figure 8:
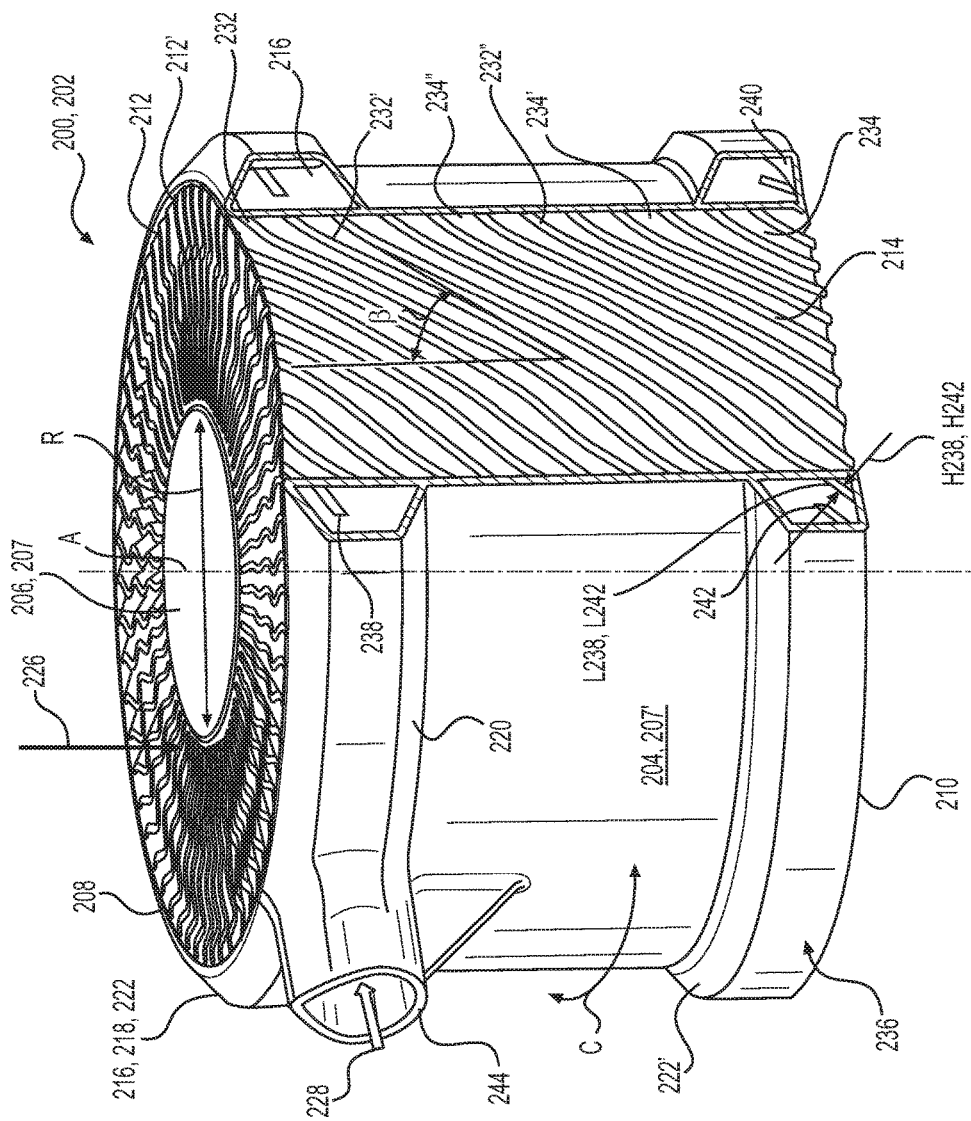
FIG. 8 is an alternate section view of the heat exchanger of FIGS. 4 and 5 taken along a plane near the circumference of the heat exchanger.

FIGS. 6 thru 8 show how each fin 212 of the heat exchanger 200 is constructed. Each fin 212 is at least partially hollow defining an internal flow passage 232 and each fin 212 of the plurality of fins is at least partially spaced away from an adjacent fin, defining an external flow passage 234. The cooled fluid 228 such as oil flows through the internal flow passages 232 while the cooling fluid 226 such as air flows over and between the fins 212. As a result of this structure and the fluid flows, the cooled fluid 228 will transfer heat to the fins 212, which in turn, will transfer that heat to the cooling fluid 226. As heat exits the cooled fluid or medium, its temperature will drop so that once the cooled medium exits the heat exchanger, it is at a suitable temperature to power various systems of a machine or vehicle, etc.

As alluded to earlier, the heat exchanger 200 further comprises a first fluid manifold portion 218 disposed proximate the first end 208 of the seamless body 202 of the heat exchanger 200 and a second fluid manifold portion 236 disposed proximate the second end 210 of the seamless body 202 of the heat exchanger 200. The first fluid manifold portion 218 includes a first hollow ring member 216 (may also be described as annular) extending about the outer cylindrical wall 204 and the outer cylindrical wall 204 defines a first plurality of slits 238 positioned proximate the first end 208 of the heat exchanger 200. Each of the first plurality of slits 238 is in fluid communication with an internal flow passage 232 of a fin 212.

Similarly, and the second fluid manifold portion 236 includes a second hollow ring member 240 (may also be described as annular) extending about the outer cylindrical wall 204 and the outer cylindrical wall 204 defines a second plurality of slits 242 positioned proximate the second end 210 of the heat exchanger 200. Each of the second plurality of slits 242 is also in fluid communication with an internal flow 232 passage of a fin 212. As best seen in FIG. 8, the top or first fluid manifold portion 218 has a trapezoidal shape with bottom and top walls 220, 222 that form an angle (similar to angle α described earlier herein) that may range from 30 to 60 degrees and may be approximately 45 degrees in certain embodiments. This allows the manifold structure to be manufactured using an additive manufacturing process without extra support structure that would need to be machined away from the heat exchanger later. The top wall 222' of the bottom or second fluid manifold portion 236 is similarly constructed for similar reasons.

It is desirable that oil entering the first fluid manifold portion 218 will be approximately evenly distributed between the fins 212. In order to accomplish this, the cross-sectional area of the first fluid manifold portion 218 taken along a plane that is perpendicular to the circumferential direction C may equal the summation of the cross-sectional areas of each of the first plurality of slits 238 taken along a plane that is tangential to the circumferential direction at each slit. Similarly, the second plurality of slits 242 may have a similar summation of cross-sectional areas and the second fluid manifold portion 236 may have the same cross-sectional area as the first fluid manifold portion 218, being measured in the same manner.

The heat exchanger 200 may further comprise a first hollow tube member 244 extending at least partially radially from the first hollow ring member 216, being in fluid communication therewith, in order to supply the cooled fluid or medium or to allow the cooled fluid or medium to egress from first fluid manifold portion 218 of the heat exchanger 200. Likewise, a second hollow tube member 246 may extend at least partially radially from the second hollow ring member 240, being in fluid communication therewith, in order to supply the cooled fluid or medium or to allow the cooled fluid or medium to egress from the second fluid manifold portion 236 of the heat exchanger 200.

As shown in the FIGS. 4 and 5, the first and second hollow tube members 244, 246 may extend purely radially from the heat exchanger 200. The first hollow tube 244 is supported by a gusset 248 to help eliminate the need for additional support structure as the heat exchanger is built using additive manufacturing technology. Hence, the extra step of machining this extra support structure may be omitted. Also, the first hollow tube member 244 is tear drop shaped to help eliminate the need for additional support structure. The second hollow tube member 246 is also tear drop shaped for similar reasons. It is contemplated that the gusset 248 and the tear drop shapes of the first and second hollow tubes 244, 246 may be eliminated if the first and second hollow tubes 244, 246 extended from the heat exchanger 200 at a suitable angle such as forty-five degrees from the longitudinal axis A of the heat exchanger 200.

Focusing on FIG. 6, each of the plurality of fins 212 is attached to the outer cylindrical wall 204 and the inner cylindrical wall 206 proximate the first end 208. At the same time, each of the plurality of fins 212 is attached to the outer cylindrical wall 204 and the inner cylindrical wall 206 proximate the second end 210. Each of the fins 212 provides a first continuous radial flow path 250 from the outer cylindrical wall 204 to the inner cylindrical wall 206 proximate the first end 208 and a second continuous radial flow path 252 from the outer cylindrical wall 204 to the inner cylindrical wall 206 proximate the second end 210. The first and second continuous radial flow paths act as "feeder tubes" so that the flow supplied by either the first or second fluid manifold portions may reach the entire radial length of the fin and flow internally along the curved portion of the fin as will be described later herein. In the alternative, these tubes allow the fluid to flow out of the fins to the exit manifold portion.

As shown in FIGS. 6 and 7, the seamless body 202 is seamless and each of the plurality of fins 212 defines a plurality of internal flow passages 232 that are spaced apart from each other radially, being separated by dividing walls 254, and each internal flow passage 232 undulates at least partially in the radial and circumferential directions. As shown in FIGS. 6 and 7, there are seven such internal flow passages 232.

Various embodiments of the heat exchanger by itself will now be described in further detail with reference to FIGS. 4 thru 8. The heat exchanger 200 may comprise a seamless body 202 such as a seamless body built using additive manufacturing technology (e.g. 3D printing technology). Such a seamless body 202 may also provide intricate features that lack abrupt geometry changes or sharp corners (e.g. blends or other transitional geometry may be provided though not clearly shown in the FIGS.). As a result, stress risers in the seamless body and leaks at seams may be avoided.

Also, the seamless body 202 may include a substantially cylindrical configuration defining a radial direction R, a circumferential direction C, a longitudinal axis A, a first cylindrical wall 207 and a plurality of fins 212. Each fin 212 may extend at least partially in the radial direction and helically along the longitudinal axis A. Furthermore, each fin 212 may be at least partially hollow defining an internal flow passage 232. The fins 212 may be set up in an array or may be otherwise arranged such that each fin is at least partially spaced away from an adjacent fin, defining an external flow passage 234. Sixty similarly or identically configured fins 212 are shown but the arrangement, configuration, number, etc. of the fins may be varied as needed or desired in other embodiments.

The first cylindrical wall 207 may be a radially inner cylindrical wall 206 and the fins 212 may extend radially outwardly from the inner cylindrical wall 206 and terminate at a free end or loop back to the inner cylindrical wall 206 and be connected to the inner cylindrical wall 206 at another point (not shown in the FIGS.). In such embodiments, a central or concentric coaxial manifold system may be employed to distribute the cooled fluid or medium to the heat exchanger or to direct the cooled fluid or medium from the heat exchanger (not shown). On the other hand, the first cylindrical wall 207 may be an outer cylindrical wall 204 and the fins 212 may extend radially inwardly and loop back to the outer cylindrical wall 204 at another location (also not shown in the FIGS.).

For the embodiment shown in FIGS. 4 thru 8, the first cylindrical wall 207 is an outer cylindrical wall 204 and the seamless body 202 includes an inner cylindrical wall 206 disposed about the longitudinal axis A and each fin 212 of the plurality of fins is attached to the outer cylindrical wall 204 and the inner cylindrical wall 206. Focusing on FIG. 7, each fin 212 (only one of which is shown but it is to be understood that each fin is similarly or identically configured) undulates along the circumferential direction C (see circumferential undulations 256) and along the radial direction R (see radial undulations 258). This may not be the case in other embodiments. For example, the fins may only undulate along the circumferential direction in other embodiments or not at all in yet further embodiments.

In like fashion, each fin 212 defines a plurality of internal flow passages 232 that undulate along the circumferential C and radial R directions. This may not be the case in other embodiments. For example, the internal flow passages 232 may only undulate circumferentially or not at all in other embodiments. Undulating the internal flow passages 232 may aid in creating turbulent flow, which may increase the heat transfer. As such, the internal flow passages 232 may act as "turbulators". In some embodiments, two to ten different turbulators may be provided. These circumferential undulations 256 may have an amplitude CA, as best seen in FIG. 7, which ranges from 8 mm to 13 mm.

As best seen in FIG. 6, seven separate internal flow passages 232 may be provided that are fed by a continuous radial flow path 250, 252 at either the first end 208 or the second end 210 of the heat exchanger 200 as previously described. Each internal flow passage 232 is differently configured because the radial undulations 258 of the fins 212 changes radially. More specifically, the radial undulations 258 decrease in amplitude as they progress from the outer cylindrical wall 204 radially inwardly to the inner cylindrical wall 206. The increased amplitude near the outer cylindrical wall 204 provides more surface area where the air flow is naturally at its greatest as provided by the fan, increasing the heat transfer rate. These radial undulations 258 may have an amplitude RA, as best seen in FIG. 5, which ranges from 0 to 14 mm as they decrease along the radial inward direction.

Looking now at FIG. 6, the height H232 (minimum dimension) of each internal flow passage 232 is fairly consistent as is the thickness (minimum dimension) of the fin. The height H232 of each internal flow passage 232 may range from 1.2 mm to 1.6 mm (and may be about 1.4 mm in some embodiments) and the thickness T212 of each fin 212 may also vary from 2.5 mm to 3.5 mm (and may be about 3 mm in some embodiments). Also, the minimum thickness of the wall of a portion of a fin may be 0.8 mm in some embodiments. Each internal flow passage 232 defines a different curvilinear length L232 (theoretical straight length once the undulations are straightened out). For the first internal flow passage 232a, its first curvilinear length L232a may range from 165 mm to 175 mm (and may be about 170 mm in some embodiments), the second internal flow passage 232b may have a second curvilinear length L232b that ranges from 170 mm to 180 mm (and may be about 174 mm in some embodiments), the third internal flow passage 232c may have a third curvilinear length L232c ranging from 175 mm to 185 mm (and may be about 179 mm in some embodiments), the fourth internal flow passage 232d may have a fourth curvilinear length L232d ranging from 180 mm to 190 mm (and may be about 187 mm in some embodiments), the fifth internal flow passage 232e may have a fifth curvilinear length L232e ranging from 190 mm to 200 mm (and may be about 193 mm in some embodiments), the sixth internal flow passage 232f may have a sixth curvilinear length L232f ranging from 200 mm to 210 mm (and may be about 206 mm in some embodiments), and the seventh internal flow passage 232g may have a seventh curvilinear length L232g ranging from 210 mm to 220 mm (and may be about 216 mm in some embodiments). The arrangement, configuration, number, etc. of the internal and external flow passages may be varied as needed or desired in other embodiments.

Turning now to FIG. 8, the fins 212 extend at a helix angle β about the longitudinal axis A that may range from 30 to 60 degrees and may be approximately 45 degrees in certain embodiments. This allows the fins 212 to be manufactured using an additive manufacturing process without extra support structure that would need to be machined away from the heat exchanger 200 later. A trade off exists between the ability to manufacture the fin 212 and its ability to allow air to pass by the fin 212. In some embodiments, a 45 degree angle is the best compromise between these performances. As described earlier herein, the slit 238, 242 that allows fluid communication to occur between a first fluid manifold portion 218 or a second fluid manifold portion 236 and a fin 212 also defines a height or thickness H238, H242 (minimum dimension) similar to that already described for the height of each internal flow passage. Each slit 238, 242 defines a slit curvilinear length L238, L242 (see bottom manifold of FIG. 8) that may range from 9 mm to 13 mm (and may be about 11 mm in some embodiments). These slits 238, 242 are measured in a plane tangential to the circumferential direction C at the slit as previously described. Each slit 238, 242 is identically or similarly configured, but it is contemplated that this might not be the case in other embodiments. There are sixty such slits 238, 242, one for each fin 212 at both the first end 208 and the second end 210 of the heat exchanger 200.

Figure 9:
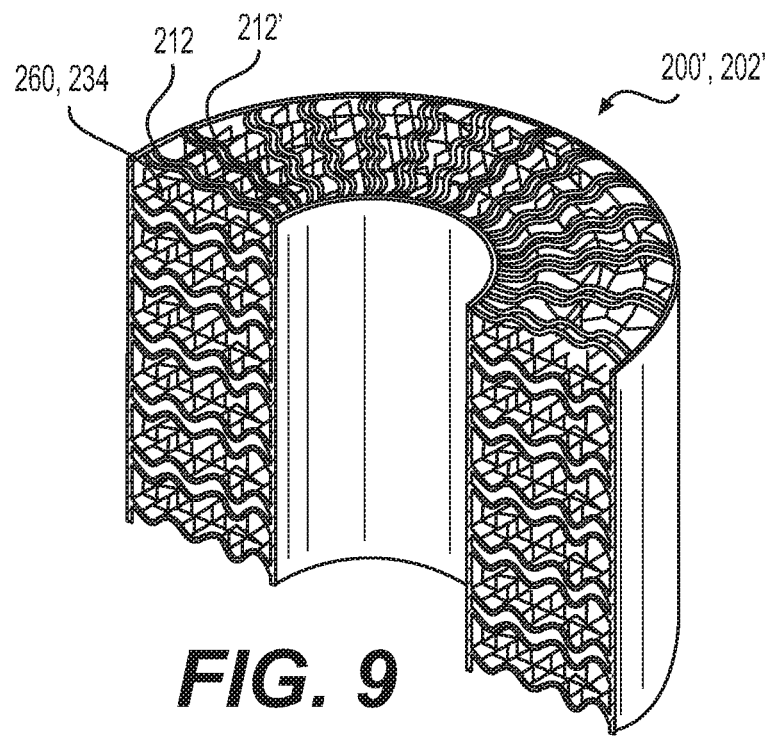
FIGS. 9 and 10 are sectional views of the heat exchanger of FIGS. 4 and 5 with lattice or mesh structure disposed between the fins.
Figure 10:
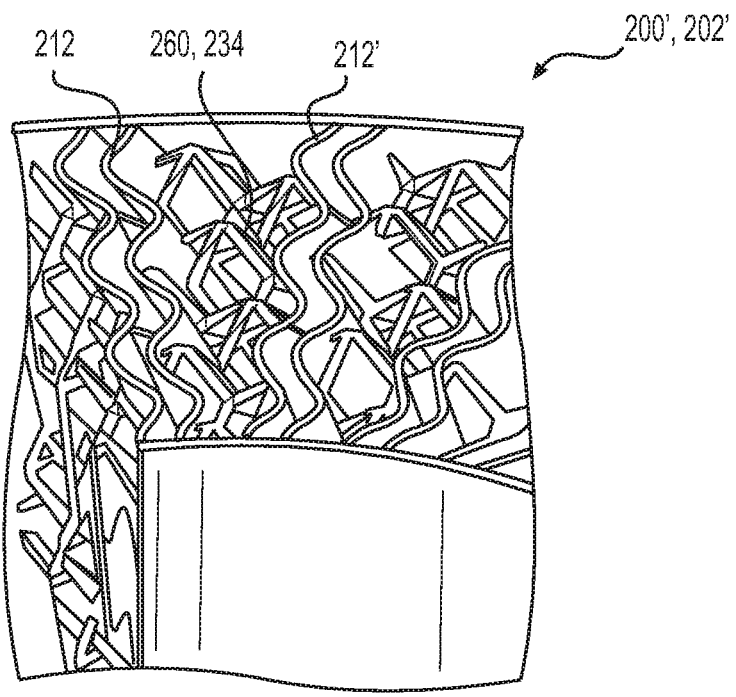

FIGS. 9 and 10 show that a lattice or a mesh structure 260 may be disposed in at least one of the external flow passages 234, connecting one fin 212 to an adjacent fin. In many embodiments, such mesh structure 260 may be placed between each of the fins 212, connecting the fins together. In other words, a first fin 212 may connect to a second fin 212', which is adjacent the first fin 212, via the mesh structure 260. Such a structure may serve various functions. For example, the mesh structure 260 may help to prevent the fins from deflecting or may otherwise provide the heat exchanger with desired rigidity. Also, the mesh structure increases the surface area, helping to improve the heat transfer. As depicted in FIGS. 9 and 10, the mesh structure is shown to have a "spaghetti" configuration but other configurations such as truncated octahedron and ring shaped are possible, etc. In addition, the density of the mesh structure may vary from one embodiment to another embodiment, from coarse to fine (e.g. a microstructure). Also, the density of the mesh structure 260 may vary from one region of the heat exchanger to another region as needed or desired.

FIGS. 11 thru 13 illustrate a heat exchanger 50 previously known in the art that is capable of rejecting 21 KW of heat. The heat exchanger 50 shown in FIG. 11 weighs 59.5 lbs and has approximately an average density of 1.5 kg/mm$^3$. Given the construction of the heat exchanger 200, the steel reinforcement plates 52 are no longer needed as shown for the heat exchanger 50 shown in FIG. 11. This reduces the weight to 31 lbs and an approximate average density of 8.33 kg/mm$^3$ as shown in FIG. 12. The construction of the heat exchanger 200 means that manifolds 54 are no longer needed as shown for the heat exchanger 50' shown in FIG. 12, yielding the aluminum core 56 of the heat exchanger as shown in FIG. 13. At this point, the weight has been reduced to 23.8 lbs and an approximate average density of 6.83 kg/mm$^3$. However, the space taken up by the aluminum core 56 of the heat exchanger is still relatively large. More particularly, the aluminum core 56 of the heat exchanger still has a high aspect ratio (height/width) of approximately 4:1.

In contrast, the heat exchanger 200 as shown in FIG. 14 (shown to scale relative to the heat exchangers of FIGS. 11 thru 13), has a dramatically reduced weight, average density, and size or aspect ratio while still being able to reject the same amount of heat (21 KW). Now, the average density is approximately 2.7 kg/mm$^3$ and the weight is approximately 12.9 lbs without mesh structure and 17.9 lbs with mesh structure, and a reduced aspect ratio of approximately 2:3. Hence, a dramatic improvement (e.g. fourfold) has been achieved by the heat exchanger 200 of FIG. 14.

In order to provide the desired heat rejection rate, a volumetric flow rate of the oil may be approximately 100 lpm (liter per minute) and the volumetric flow rate of the air may be approximately 30 cmm (cubic meter per minute). These flow rates may yield a high enough Reynolds number or Nusselt number so that the desired heat transfer rate is achieved. The cross-sectional area of the inlet 230 (taken along a plane perpendicular to the flow) or outlet 231 may be approximately the same as the cross-sectional area of the first hollow ring member 216 or the second hollow ring shaped member 240 of the first fluid manifold portion 218 or the second fluid manifold portion 236 respectively (taken along a plane perpendicular to the flow) and that area may be approximately 850 mm$^2$. The height H200 of the heat exchanger 200 measured along the longitudinal axis A may be approximately 186 mm while the outer diameter D204 of the outer cylindrical wall 204 may be approximately 256 mm.

Any of the dimensions or configurations discussed herein for any embodiment of a heat exchanger or heat exchanger assembly or associated features may be varied as needed or desired. Also, the heat exchanger may be made from any suitable material that has the desired structural strength and thermal conductivity. For the embodiment discussed regarding FIG. 14, aluminum may be used. However, other materials such as copper, beryllium copper, titanium, stainless steel, thermally conductive thermoplastics, etc. may be used.

INDUSTRIAL APPLICABILITY

In practice, a heat exchanger, or a heat exchanger assembly according to any embodiment described herein may be sold, bought, manufactured or otherwise obtained in an OEM or after-market context.

In some cases for the heat exchanger assembly 100, the housing for holding the heat exchanger 200 may be eliminated by using a wall 204 of the heat exchanger 200 itself to act as the housing, such as shown in FIGS. 1 thru 3. In other embodiments, a separate housing may be supplied.

Figure 15:
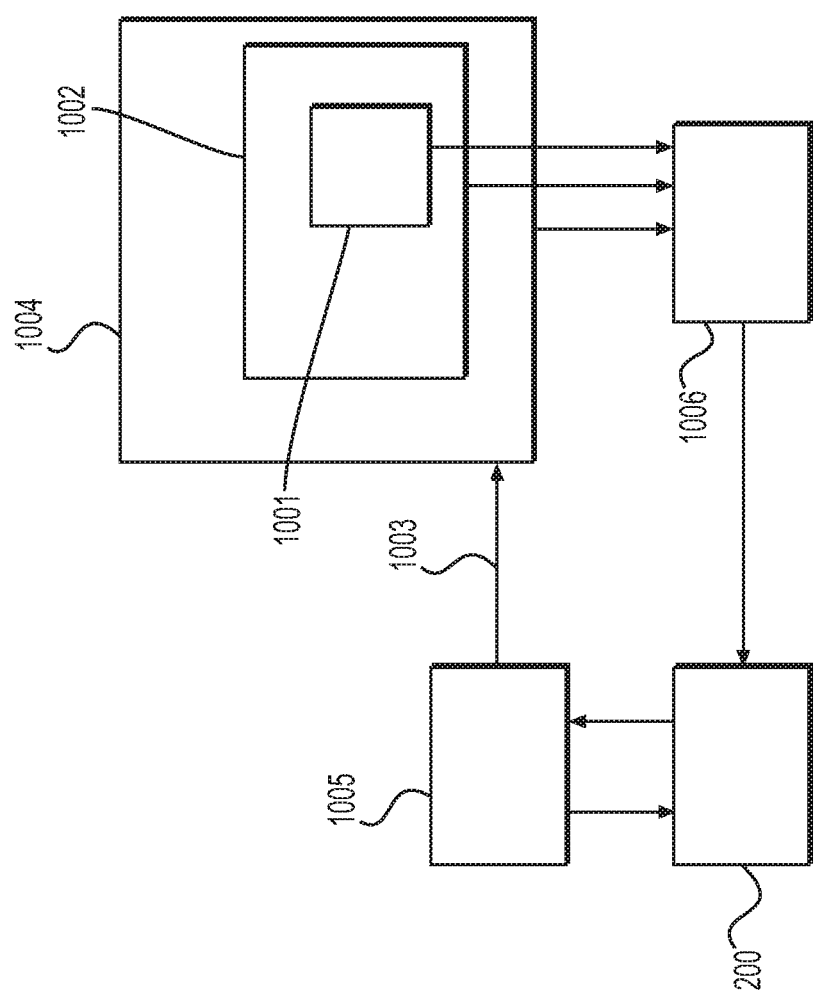
FIG. 15 is a schematic depicting a method and representing a system for generating a three-dimensional model of the heat exchanger according to an embodiment of the present disclosure.
Figure 16:
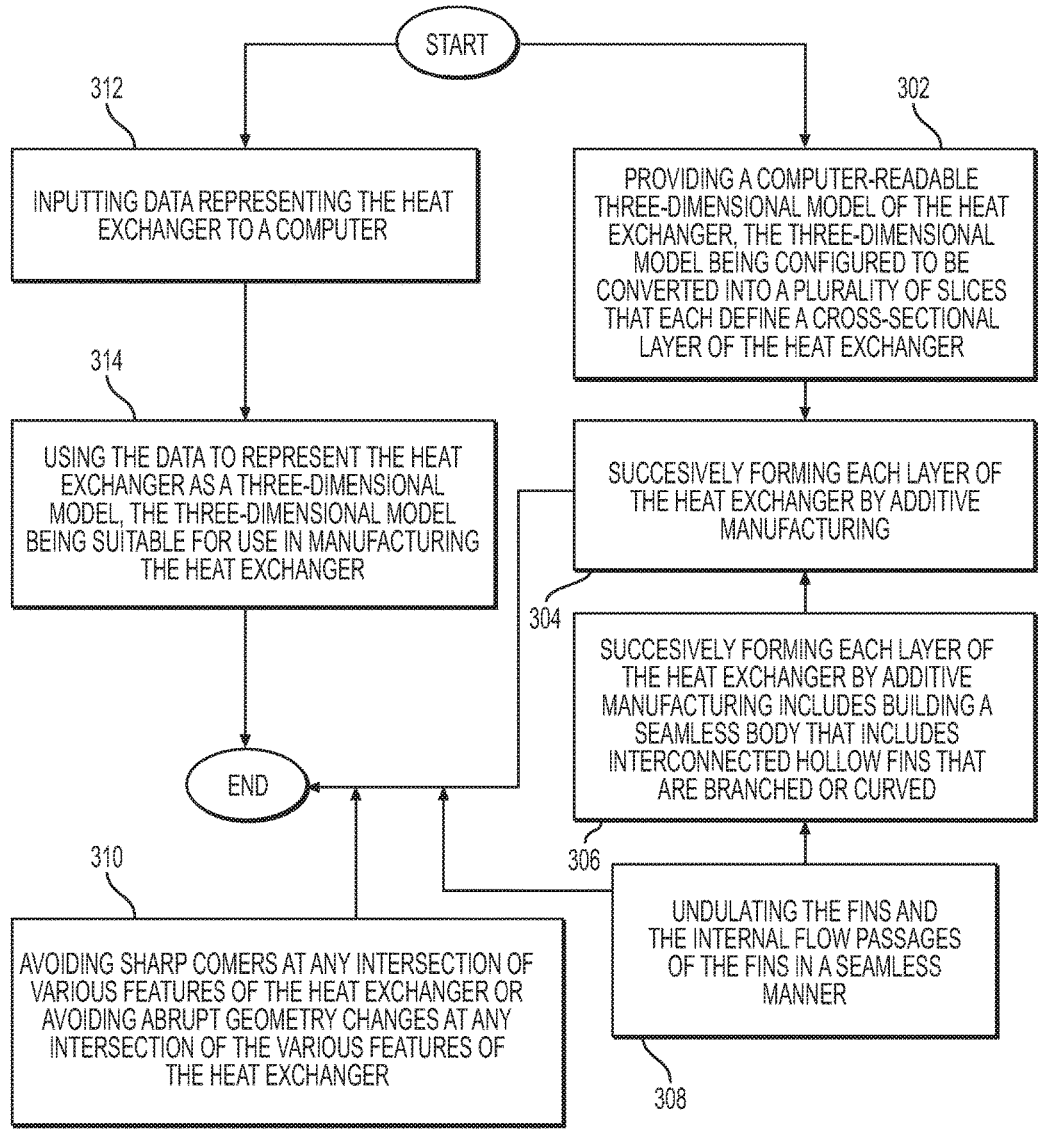
FIG. 16 is a flowchart illustrating a method of creating a heat exchanger according to an embodiment of the present disclosure.

With reference to FIGS. 15 and 16, the disclosed heat exchanger 200 may be manufactured using conventional techniques such as, for example, casting or molding. Alternatively, the disclosed heat exchanger 200 may be manufactured using conventional techniques generally referred to as additive manufacturing or additive fabrication. Known additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of the heat exchanger 200 in order to manufacture, or fabricate, the heat exchanger 200. In one case, the disclosed heat exchanger 200 would be an original component and the 3D printing process would be utilized to manufacture the heat exchanger 200. In other cases, the 3D process could be used to replicate an existing heat exchanger 200 and the replicated heat exchanger 200 could be sold as aftermarket parts. These replicated aftermarket heat exchanger 200 could be either exact copies of the original heat exchanger 200 or pseudo copies differing in only non-critical aspects.

With reference to FIG. 15, the three-dimensional model 1001 used to represent an original heat exchanger 200 may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory or non-transitory medium on which information or data readable by at least one processor may be stored. This storage medium may be used in connection with commercially available 3D printers 1006 to manufacture, or fabricate, the heat exchanger 200. Alternatively, the three-dimensional model may be transmitted electronically to the 3D printer 1006 in a streaming fashion without being permanently stored at the location of the 3D printer 1006. In either case, the three-dimensional model constitutes a digital representation of the heat exchanger 200 suitable for use in manufacturing the heat exchanger 200.

The three-dimensional model may be formed in a number of known ways. In general, the three-dimensional model is created by inputting data 1003 representing the heat exchanger 200 to a computer or a processor 1004 such as a cloud-based software operating system. The data may then be used as a three-dimensional model representing the physical heat exchanger 200. The three-dimensional model is intended to be suitable for the purposes of manufacturing the heat exchanger 200. In an exemplary embodiment, the three-dimensional model is suitable for the purpose of manufacturing the heat exchanger 200 by an additive manufacturing technique.

In one embodiment depicted in FIG. 15, the inputting of data may be achieved with a 3D scanner 1005. The method may involve contacting the heat exchanger 200 via a contacting and data receiving device and receiving data from the contacting in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of the heat exchanger 200 by contacting a probe with the surfaces of the heat exchanger 200 in order to generate a three-dimensional model. In other embodiments, the 3D scanner 1005 may be a non-contact type scanner and the method may include directing projected energy (e.g. light or ultrasonic) onto the heat exchanger 200 to be replicated and receiving the reflected energy. From this reflected energy, a computer would generate a computer-readable three-dimensional model for use in manufacturing the heat exchanger 200. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed heat exchanger 200 using the CAD software.

A three-dimensional model would be generated from the CAD virtual 3D model in order to manufacture the heat exchanger 200.

The additive manufacturing process utilized to create the disclosed heat exchanger 200 may involve materials such as described earlier herein. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

Focusing on FIG. 17, the method 300 for manufacturing a heat exchanger according to any embodiment disclosed herein may comprise providing a computer-readable three-dimensional model of the heat exchanger, the three-dimensional model being configured to be converted into a plurality of slices that each define a cross-sectional layer of the heat exchanger (block 302); and successively forming each layer of the heat exchanger by additive manufacturing (block 304). Successively forming each layer of the heat exchanger by additive manufacturing may include building a seamless body that includes interconnected hollow fins that are branched or curved (block 306). Also, the method may comprise undulating the fins and the internal flow passages of the fins in a seamless manner (block 308). Furthermore, the method may comprise avoiding sharp corners at any intersection of various features of the heat exchanger or avoiding abrupt geometry changes at any intersection of the various features of the heat exchanger (block 310). The heat exchanger 200 may be built from the bottom toward the top.

Alternatively, the method 300 may include inputting data representing the heat exchanger to a computer (block 312) and using the data to represent the heat exchanger as a three-dimensional model, the three dimensional model being suitable for use in manufacturing the heat exchanger (block 314).

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A heat exchanger comprising:
   a seamless body comprising a first cylindrical wall, defining a longitudinal axis, a radial direction passing through the longitudinal axis being perpendicular thereto, a circumferential direction that is perpendicular to the longitudinal axis and tangential to the radial direction, wherein the first cylindrical wall is an outer cylindrical wall and the seamless body further comprises an inner cylindrical wall disposed about the longitudinal axis; and
   the seamless body further comprising a plurality of fins including a first fin and a second fin:
      wherein each fin of the plurality of fins extends from the first cylindrical wall at least partially in the radial direction and helically along the longitudinal axis, each fin of the plurality of fins is at least partially hollow defining an internal flow passage that is spaced away from and fluidly isolated from the internal flow passage of an adjacent fin of the plurality of fins, and the first fin of the plurality of fins is at least partially spaced away from the second fin of the plurality of fins, defining an external flow passage, wherein each fin of the plurality of fins is attached to the outer cylindrical wall.

2. The heat exchanger of claim 1 further comprising a mesh structure that is formed by the seamless body and that is disposed in the external flow passage, connecting the first fin of the plurality of fins to the second fin of the plurality of fins.

3. The heat exchanger of claim 1 wherein each fin of the plurality fins undulates along the circumferential direction.

4. The heat exchanger of claim 3 wherein each fin of the plurality of fins undulates along the radial direction.

5. The heat exchanger of claim 4 wherein each fin of the plurality of fins defines a plurality of internal flow passages that undulate along the circumferential and radial directions.

6. A heat exchanger assembly comprising: a heat exchanger comprising
   a body including an outer cylindrical wall and an inner cylindrical wall, wherein the outer cylindrical wall and the inner cylindrical wall define the same longitudinal axis, the same radial direction that passes through the longitudinal axis and that is perpendicular thereto, and the same circumferential direction that is tangential to the radial direction and perpendicular to the longitudinal direction, and the inner cylindrical wall is spaced radially away from the outer cylindrical wall, the body further defining a first end and a second end disposed along the longitudinal axis; and
   a plurality of fins extending radially from the outer cylindrical wall to the inner cylindrical wall, each of the plurality of fins also extending in an arcuate path longitudinally from the first end to the second end;
   wherein each fin of the plurality of fins is at least partially hollow defining an internal flow passage that is spaced away from and fluidly isolated from the internal flow passage of the adjacent fin of the plurality of fins and each fin of the plurality of fins is at least partially spaced away from an adjacent fin of the plurality of fins, defining an external flow passage; and
   a fan disposed proximate either the first end or the second end of the body of the heat exchanger, and the outer cylindrical wall defines a first diameter and the fan defines a second diameter that is equal to or greater than then the first diameter.

7. The heat exchanger assembly of claim 6 wherein the heat exchanger further comprises a first fluid manifold portion disposed proximate the first end of the body of the heat exchanger and a second fluid manifold portion disposed proximate the second end of the body of the heat exchanger.

8. The heat exchanger assembly of claim 7 wherein the first fluid manifold portion includes a first hollow ring member extending about the outer cylindrical wall, the outer cylindrical wall defining a first plurality of slits positioned proximate the first end, each of the first plurality of slits being in fluid communication with an internal flow passage of a single fin of the plurality of fins, and the second fluid manifold portion includes a second hollow ring member extending about the outer cylindrical wall, the outer cylindrical wall defining a second plurality of slits positioned proximate the second end, each of the second plurality of slits being in fluid communication with an internal flow passage of a single fin of the plurality of fins.

9. The heat exchanger assembly of claim 8 further comprising a first hollow tube member extending at least partially radially from the first hollow ring member, being in fluid communication therewith, and a second hollow tube member extending at least partially radially from the second hollow ring member, being in fluid communication therewith.

10. The heat exchanger assembly of claim 9 wherein each of the plurality of fins is attached to the outer cylindrical wall and the inner cylindrical wall proximate the first end and each of the plurality of fins is attached to the outer cylindrical wall and the inner cylindrical wall proximate the second end, wherein each of the fins provides a first continuous radial flow path from the outer cylindrical wall to the inner cylindrical wall proximate the first end and a second continuous radial flow path from the outer cylindrical wall to the inner cylindrical wall proximate the second end.

11. The heat exchanger assembly of claim 6 wherein the body is seamless and each of the plurality of fins defines a plurality of internal flow passages that are spaced apart from each other radially, being separated by dividing walls, and each flow passage undulates at least partially in the radial and circumferential directions.

12. The heat exchanger assembly of claim 8 further comprising a C-shaped attachment bracket including a horizontal annular member defining a first plurality of apertures, a vertical annular member extending downward from the horizontal annular member, and an angled flange extending from the vertical annular member at an angle to the longitudinal axis configured to engage the first hollow ring member.

* * * * *